Jan. 8, 1957 W. C. SAEMAN 2,777,069
WEB GUIDE CONTROL DEVICE
Filed March 31, 1953

INVENTOR.
BY WALTER C. SAEMAN
Parrott & Richards
ATTORNEYS

United States Patent Office 2,777,069
Patented Jan. 8, 1957

2,777,069

WEB GUIDE CONTROL DEVICE

Walter C. Saeman, Brevard, N. C., assignor to Olin Mathieson Chemical Corporation, a corporation of Virginia Application March 31, 1953, Serial No. 345,814

2 Claims. (Cl. 250—219)

This invention relates to means for guiding traveling webs so as to maintain a proper web alignment, and more particularly to an improved means of this sort by which stable operation of the guide means is obtained free of any tendency for over-adjustment and consequent hunting oscillation.

Figure 1:
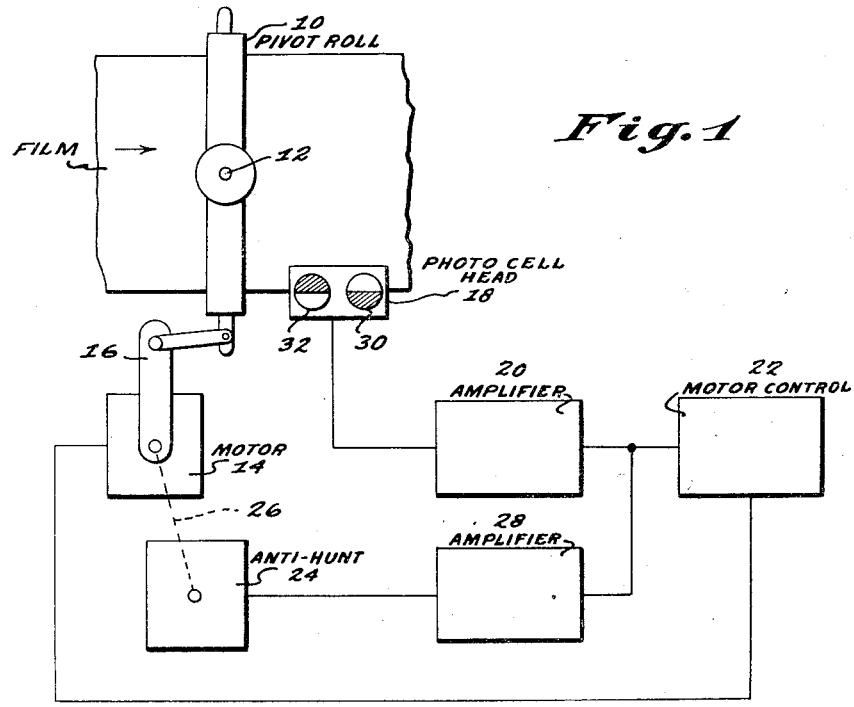
Figure 2:
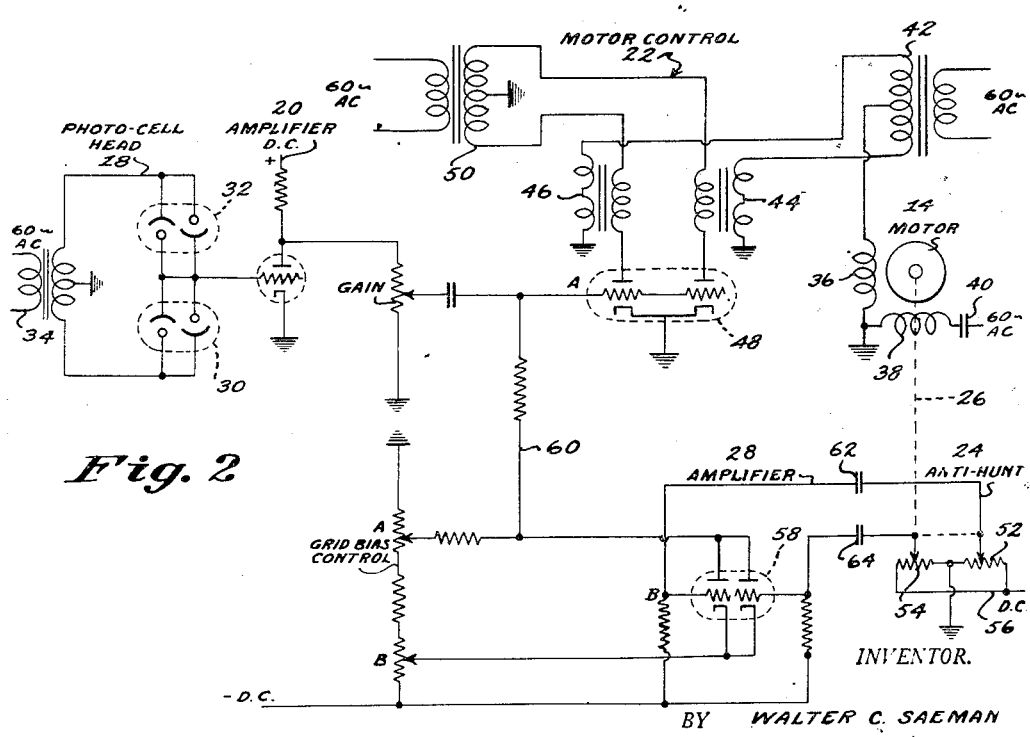

The improved web guide control device of the present invention is described in detail below in connection with the accompanying drawings, in which:

Fig. 1 is a schematic diagram representing the relative arrangement of the operating elements of a device embodying the present invention; and Fig. 2 is a suitable electrical diagram corresponding to Fig. 1.

The drawings illustrate, as a representative embodiment, an arrangement of the device of the present invention as a web guide control for use in handling a traveling cellophane film web so as to maintain the side edge alignment thereof during a coating operation for example, because it is especially useful and well adapted for this purpose, although it will be apparent from the following description that the device might be adapted also for similar use in handling other web materials in general.

It is known that photo-cells may be made responsive to the edge of a cellophane film by polarization of the light beams actuating the cells, since cellophane film polarizes light too, as disclosed for example in U. S. Patent No. 2,474,906, issued July 5, 1949. The device of the present invention makes use of this principle in providing for side edge alignment scanning of a cellophane film. In the case of other web materials for which light polarization would not be applicable, any other conventional photoelectric scanning arrangement could be used instead that was suited to the particular web material involved.

The embodiment illustrated in the drawings is represented in Fig. 1 as utilizing a centrally pivoted guide roll means 10 for maintaining edge alignment of the traveling web of cellophane film being handled. The pivot roll means 10 suitably comprises a guide roll (of which there may be more than one if desired) over which the cellophane film being handled is trained for guiding, the pivot roll means 10 being mounted as a whole for central pivoting about an axis normal to the width of the cellophane film web trained thereover for guiding. Guiding of the celophane film results from pivoting of the roll means 10 so that it is angled transversely with respect to the film web to change the lateral displacement of the web as it comes off the roll means. Such guiding arrangements are well known in the prior art, as disclosed for example in U. S. Patent No. 2,331,030, issued October 5, 1943, and U. S. Patent No. 2,607,588.

The guide roll means 10 represented in Fig. 1 has the central pivot mounting therefor indicated at 12, and a drive motor 14 is shown mechanically coupled as at 16 for pivoting the roll means 10, this mechanical coupling being any suitable linkage adapted for this purpose, such as an arcuate rack driven from a pinion rotating with the armature shaft of drive motor 14 or in some ratio thereto (not shown).

The photoelectric scanning means for actuating the pivot roll drive motor 14 is represented in Fig. 1 at 18 connected through an amplifier 20 for transmitting side edge deviation signals to a motor control 22 and thereby actuating the drive motor 14 to effect connective pivotal guiding adjustment of the pivot roll means 10 upon detection of any side edge deviation of the film from the aligned rectilinear path desired.

In a system containing only the elements noted just above, however, the inherent time lag in signaling side edge deviations, the dead zone that is necessarily present as a practical matter in detecting side edge deviations, static friction and inertia of the mechanical operating elements, and the like, result in unstable operation. That is, the drive motor 14 fails to respond promptly to small deviation signals from the photoelectric scanning means 18, and when the side edge deviation signal becomes great enough to start the drive motor 14 it overshoots in making the required connective adjustment of the pivot roll means 10, so as to cause a deviation in the other direction that is likely to result in a sustained hunting oscillation, which is an unsatisfactory condition at best and is intolerable with web material such as cellophane film that will wrinkle and break when subjected to a condition of this sort.

Accordingly, the device of the present invention is further provided with a counter signaling or anti-hunt means 24, that is mechanically coupled as at 26 to the drive motor 14 for adjustment from the pivoting movement of the guide roll means 10 to impose a counter signal in opposition to the deviation signal so as to anticipate the corrective adjustment of the guide roll means 10 and avoid over-adjustment thereof. The counter signal may be imposed by anti-hunt means 24 through an amplifier 28 at the motor control 22 as illustrated in Fig. 2.

Fig. 2 shows the photo-cell head 18 arranged with a pair of twin photo-cells 30 and 32 connected to form a bridge across an alternating line source as at 34. To utilize the birefringent property of cellophane film, as mentioned above, one of these photo-cells such as 30 is positioned in a light beam that is polarized to extinction wihout film, so that light is transmitted with film interposed; while the light beam for the other photo-cell such as 32 is polarized to extinction with film interposed, so that it will transmit light whenever the film clears the beam. With the photo-cells 30 and 32 arranged in this manner, equal lighting of both cells results when the film side edge is on line across their centers (as illustrated in Fig. 1), and in which case the voltage drops through the bridge formed by the photo-cells 30 and 32 remain balanced during each alteration of current from the line source 34, so that no signal is supplied by the photo-cell head 18. If, however, the light is not balanced between the two photo-cells 30 and 32, as would be the case upon side edge deviation of the film from the centrally aligned position indicated in Fig. 1, the voltage drops in the bridge connected photo-cells 30 and 32 are different, causing a signal of the side edge deviation to be impressed on the grid of the amplifier 20. The phase of this signal is either like or opposite the phase of the line source 34, depending on the direction in which the photo-cells 30 and 32 have become unbalanced by the side edge deviation.

The pivot roll drive motor 14 that is actuated from this side edge deviation signal, as mentioned above, suitably comprises a reversible two-phase induction motor having a control winding 36 and an exciter winding 38 in which the exciter phase is displaced 90° from the line phase by the use of a condenser as at 40 or equivalent device. The direction of rotation of motor 14 is determined by the phase of the control winding 36 with respect to the exciter winding 38. The control phase of the motor 14 is dictated by the signal phase from the photo-cell head 18 and is accordingly either like or opposite to the line phase.

The control winding 36 is energized from a center tapped transformer 42, the end terminals of which are grounded through saturable core reactors 44 and 46. The saturable core reactors 44 and 46 are energized by a twin-triode 48 in which the plates are excited by alternating current of opposite phase through connections to a second center tapped transformer 50, and in which the grid is connected in the plate circuit from the amplifier 20 and is biased to cut-off. Under these conditions, the twin-triode 48 constitutes a signal transmiting means that responds only to positive grid pulses, and only that half of the twin-triode 48 responds in which the plate and grid voltages are in phase. As a result, only one of the saturable core reactors 44 or 46 can be energized at a time, so that the motor 14 will be caused to rotate in the direction corresponding to the reactor 44 or 46 that is energized in accordance with the phase of the grid signal at the twin-triode 48. The motor 14 may then be coupled at 16 to the pivot roll means 10 so as to effect corrective alignment adjustment of the traveling film web in a direction opposite to the direction of side edge deviation that has been signalled from the photo-cell head 18 and thereby automatically restore the film to the neutral side edge position with respect to the photo-cell head at 18.

In order to avoid the hunting oscillation of this system that has been mentioned above, the anti-hunt means 24 is introduced to provide a voltage signal proportional to the speed of motor 14, and consequently to the adjustment of the pivot roll means 10, that may be impressed to increase the negative bias of the twin-triode 48 and thereby decrease the strength of the side edge deviation signal from the photo-cell head 18 in anticipation of correction of a side edge deviation that has been signalled. By this means, the motor 14 is caused to decelerate and stop sooner so that overrunning is prevented.

This anti-hunt means 24 comprises a pair of potentiometers 52 and 54 that are mechanically coupled as at 26 to follow the corrective movement of the pivot roll means 10 by the drive motor 14 as previously mentioned, the potentiometers 52 and 54 being oppositely coupled in this manner so that a positive signal is sent from a direct current line source 56 through capacitors 62 and 64 for either direction of rotation of the motor 14. This signal is impressed on the grid circuit of amplifier 28 which comprises a second twin-triode 58 operated with cut-off grid bias so that it responds only to positive signals from the potentiometers 52 and 54, and has the plate circuit thereof connected as at 60 in the grid circuit for the first twin-triode 48 to increase the negative bias thereof as previously explained.

The present invention has been described in detail above for purposes of illustration only and is not intended to be limited by this description or otherwise except as defined in the appended claims.

I claim:

1. A device of the character described comprising a reversible electric motor mechanically coupled for adjusting the position of another means, photoelectric scanning means for continuously detecting a mechanical effect of the position of said other means and directionally signaling any deviation from a desired mechanical effect of said position, said photoelectric scanning means including a pair of twin photo-cells connected to form a bridge having an alternating current impressed thereon, electrical signal transmitting means for continuously actuating said motor from any deviation signaled by said scanning means in a direction for adjusting the position of said other means to correct the signaled deviation, said signal transmitting means incorporating a first twin-triode biased to cut-off, and electrical counter signaling means electrically connected with said signal transmitting means and adjusted mechanically from any adjustment of the position of said other means for opposing the actuating deviation signal therefor in anticipation of correction of the signaled deviation and thereby avoiding over-adjustment of the position of said other means in correcting said signaled deviation, said counter-signaling means comprising a pair of potentiometers mechanically coupled for adjustment in opposite directions from an adjustment of the position of said other means and having a direct current voltage impressed thereon, a second twin-triode connected as an amplifier with said pair of potentiometers and biased to cut-off for receiving only positive signals therefrom, and means connecting said second twin-triode in the grid circuit of said first twin-triode for increasing the bias thereof.

2. A web guide control device for cellophane film comprising web guide roll means centrally pivoted on an axis normal to the width of a traveling cellophane web trained thereover for guiding, a reversible electric motor mechanically coupled for pivoting said roll means and thereby guiding said web, photoelectric scanning means polarized for continuously detecting the side edge position of said cellophane web and directionally signaling any deviation thereof from a rectilinear path, electrical signal transmitting means for continuously actuating said motor from any deviation signaled by said scanning means in a direction for pivotally adjusting said roll means to correct a signaled side edge deviation of said web, and electrical counter signaling means electrically connected with said signal transmitting means and mechanically adjusted from the pivotal adjusting movement of said roll means for opposing the actuating deviation signal therefor proportionally to the actuation of said motor in anticipation of correction of the signaled deviation and thereby avoiding over-adjustment of said roll means in correcting said signaled deviation, the photoelectric scanning means includes a pair of twin photo-cells connected to form a bridge having an alternating current impressed thereon; said signal transmitting means incorporates a first twin-triode biased to cut-off; and said counter signaling means comprises a pair of potentiometers mechanically coupled for adjustment in opposite directions from said pivot roll means movement and having a direct current voltage impressed thereon, a second twin-triode connected as an amplifier with said pair of potentiometers and biased to cut-off for receiving only positive signals therefrom, and means connecting said second twin-triode in the grid circuit of said first twin-triode for increasing the bias thereof.

References Cited in the file of this patent
UNITED STATES PATENTS

| | | |
|---|---|---|
| 2,069,516 | Baker | Feb. 2, 1937 |
| 2,276,506 | Moore | Mar. 17, 1942 |
| 2,300,742 | Harrison et al. | Nov. 3, 1942 |
| 2,449,476 | Harrison | Sept. 14, 1948 |
| 2,452,609 | Somers et al. | Nov. 2, 1948 |
| 2,583,580 | Ludwig | Jan. 29, 1952 |